(12) United States Patent
Shitrit et al.

(10) Patent No.: US 12,109,635 B2
(45) Date of Patent: Oct. 8, 2024

(54) ROTATABLE CUTTING HEAD HAVING TIP PORTION WITH RADIALLY EXTENDING CUTTING EDGES FORMING A CUTTING PROFILE HAVING CONCAVE AND CONVEX SUB-PORTIONS

(71) Applicant: ISCAR, LTD., Tefen (IL)

(72) Inventors: Shim'on Shitrit, Kibbutz Metsuba (IL); Anatoly Yanovski, Maalot (IL)

(73) Assignee: ISCAR, LTD., Tefen (IL)

( * ) Notice: Subject to any disclaimer, the term of this patent is extended or adjusted under 35 U.S.C. 154(b) by 255 days.

(21) Appl. No.: 17/677,073

(22) Filed: Feb. 22, 2022

(65) Prior Publication Data
US 2022/0339713 A1 Oct. 27, 2022

Related U.S. Application Data (60) Provisional application No. 63/177,476, filed on Apr. 21, 2021.

(51) Int. Cl.
*B23B 51/02* (2006.01)
*B23B 51/00* (2006.01)

(52) U.S. Cl.
CPC ...... *B23B 51/0007* (2022.01); *B23B 51/0003* (2022.01); *B23B 2251/0825* (2022.01); *B23B 2251/087* (2013.01); *B23B 2251/12* (2013.01)

(58) Field of Classification Search
CPC ...... B23B 2251/0825; B23B 2251/087; B23B 2251/082; B23B 2251/14;
(Continued)

(56) References Cited

U.S. PATENT DOCUMENTS 5,957,631 A 9/1999 Hecht
6,109,841 A 8/2000 Johne
(Continued)

FOREIGN PATENT DOCUMENTS

FR 2757432 A1 * 6/1998 ............ B23B 51/02
WO WO 2013/143348 10/2013
WO WO 2018/079489 5/2018

OTHER PUBLICATIONS

English Abstract of FR 2757432 (Year: 1998).*
(Continued)

*Primary Examiner* — Alan Snyder
(74) *Attorney, Agent, or Firm* — Womble Bond Dickinson (US) LLP (57) ABSTRACT

A cutting head rotatable about a central axis, includes a tip portion and an intermediate portion. The tip portion has an axially forwardmost tip point contained in the central axis and at least two axially forward-facing front surfaces, each front surface having a radially extending cutting edge. The intermediate portion has at least two head lands circumferentially alternating with at least two chip evacuation passages, each head land having a leading edge extending axially rearwardly from the tip portion. The cutting edges are contained in an imaginary annular ring surface, and a first imaginary radial plane containing the central axis intersects the imaginary annular ring surface to form two imaginary radial cutting profiles. Each imaginary radial cutting profile has consecutively radially outward extending first, second, and third cutting profile portions, and the second cutting profile portion includes first and second concave sub-portions spaced apart by a first convex sub-portion.

20 Claims, 4 Drawing Sheets

(58) Field of Classification Search
CPC .......... B23B 2251/182; B23B 2251/18; B23B 51/0003; B23B 51/0002; B23B 51/02
See application file for complete search history.

(56) References Cited

U.S. PATENT DOCUMENTS

| | | |
|---|---|---|
| 6,276,879 B1 | 8/2001 | Hecht |
| 6,582,164 B1 | 6/2003 | McCormick |
| 7,309,196 B2 | 12/2007 | Ruy Frota de Souza |
| 7,360,974 B2 | 4/2008 | Borschert et al. |
| 7,377,730 B2 | 5/2008 | Hecht et al. |
| 7,467,915 B2 | 12/2008 | De Souza |
| 7,972,094 B2 | 7/2011 | Men et al. |
| 8,021,088 B2 | 9/2011 | Hecht |
| 8,534,966 B2 | 9/2013 | Hecht |
| 8,556,552 B2 | 10/2013 | Hecht |
| 8,784,018 B2 | 7/2014 | Păbel |
| 8,882,413 B2 | 11/2014 | Hecht |
| 8,992,141 B2 | 3/2015 | Hecht et al. |
| 8,992,142 B2 | 3/2015 | Hecht |
| 9,028,180 B2 | 5/2015 | Hecht |
| 10,071,430 B2 | 9/2018 | Frota De Souza Filho et al. |
| 10,173,271 B2 | 1/2019 | Hecht |
| 11,110,521 B2 | 9/2021 | Hecht |
| 2009/0116920 A1 | 5/2009 | Bae |
| 2011/0116884 A1 | 5/2011 | Li |
| 2012/0301239 A1* | 11/2012 | Prom .................... B23P 15/32 408/226 |
| 2012/0315101 A1 | 12/2012 | Osawa et al. |
| 2015/0266107 A1 | 9/2015 | Gonen et al. |
| 2018/0065191 A1 | 3/2018 | Hecht |
| 2018/0243843 A1 | 8/2018 | Schwagerl |
| 2019/0275594 A1 | 9/2019 | Hecht |
| 2019/0375029 A1 | 12/2019 | Katagiri |
| 2020/0108449 A1 | 4/2020 | Brodski et al. |

OTHER PUBLICATIONS

International Search Report dated Jul. 5, 2022, issued in PCT counterpart application (No. PCT/IL2022/050312).
Written Opinion dated Jul. 5, 2022, issued in PCT counterpart application (No. PCT/IL2022/050312).

* cited by examiner

ROTATABLE CUTTING HEAD HAVING TIP PORTION WITH RADIALLY EXTENDING CUTTING EDGES FORMING A CUTTING PROFILE HAVING CONCAVE AND CONVEX SUB-PORTIONS

RELATED APPLICATIONS

The present application claims priority to U.S. Provisional Patent Application No. 63/177,476 filed Apr. 21, 2021. The content of the aforementioned application is incorporated by reference in their entirety.

FIELD OF THE INVENTION

The present invention relates to a rotatable cutting head having a tip portion with radially extending cutting edges, for use in metal cutting processes in general, and for drilling operations in particular.

BACKGROUND OF THE INVENTION

Within the field of cutting tools used in drilling operations, there are some examples of rotatable cutting heads having a tip portion with radially extending cutting edges forming a cutting profile having stepped sub-portions.

US 2011/0116884 A1 discloses a helical bit tool including a bit head with multiple helical pieces. Each helical piece has a side cutting edge which faces on the direction of cutting operation. The surface of the side cutting edge which faces on the direction of cutting operation forms a cutting face. The back surface of the cutting face forms a rear cutting face. The step area is formed on the top surface of the bit head, in which forming a step or multiple steps with progressively lower heights from the center of the top surface to the outer flank. The periphery of every step is inclined with respect to the periphery of the bit head. In some embodiments, arcuate grooves associated with each step may also be present. By virtue of such steps and grooves, a profile of each side cutting edge has discontinuities, and therefore is not smoothly curved. A chamfering surface is formed on where the rear cutting face interfaces with the step area and the top surface of the bit head. An upright cutting face is formed on the side of the chamfering surface near the center of the top surface. The intersection of the chamfering surface, the step area and the top surface of the bit head forms a rear cutting edge. The intersection of the upright cutting face and the step area at its back side forms a chisel.

WO 2013/143348 A1 discloses a twist drill for drilling fine holes on high-strength and high-hardness alloy material comprising blade backs, a twist drill body, a main cutting edge and side cutting edges. The main cutting edge is mainly composed of multi-stepped inclined edges, multi-stepped flat edges, multi-stepped guide edges, a reaming edge, a reaming and finishing edge, an inner edge formed after chisel edge thinning and a chisel edge, which are connected together. Again, by virtue of these steps, a profile of each side cutting edge has discontinuities, and therefore is not smoothly curved.

It is an object of the present invention to provide an improved rotatable cutting head having a tip portion configured for smooth penetration into a workpiece.

It is also an object of the present invention to provide an improved rotatable cutting head having a tip portion configured to perform drilling operations with reduced cutting-edge stresses.

It is a further object of the present invention to provide an improved rotatable cutting head having a tip portion which can be efficiently and precisely manufactured.

SUMMARY OF THE INVENTION

In accordance with the present invention, there is provided a cutting head rotatable about a central axis in a direction of rotation, the central axis defining a forward-to-rearward axial direction, and comprising:
  a tip portion having an axially forwardmost tip point contained in the central axis and at least two axially forward-facing front surfaces forming at least one chisel edge extending from or containing the tip point,
    the at least one chisel edge having at least two radially outermost chisel endpoints; and
    each front surface having a cutting edge extending radially outwardly from one of the radially outermost chisel endpoints, and
  an intermediate portion having at least two head lands circumferentially alternating with at least two chip evacuation passages, each head land having a leading edge extending axially rearwardly from the tip portion, and each chip evacuation passage having a head flute extending axially rearwardly from the tip portion and intersecting one of the leading edges,
    each leading edge having an axially forwardmost endpoint, and the at least two axially forwardmost endpoints defining an imaginary cutting circle having a cutting diameter and a center coincident with the central axis,
wherein:
the at least two cutting edges are contained in an imaginary annular ring surface exhibiting circular symmetry about the central axis, and
in a cross-section taken in a first imaginary radial plane containing the central axis and intersecting the imaginary annular ring surface, the imaginary annular ring surface forms two imaginary radial cutting profiles, each imaginary radial cutting profile including consecutively radially outward extending first, second, and third cutting profile portions,
and wherein:
each first cutting profile portion has a first radially innermost endpoint and a first radially outermost endpoint, and extends radially outward and axially rearward away from the central axis,
each second cutting profile portion has a second radially innermost endpoint and a second radially outermost endpoint, and includes first and second concave sub-portions spaced apart by a first convex sub-portion,
the entire second concave sub-portion is located radially outward of and axially rearward of the entire first concave sub-portion, and
a first imaginary straight line tangential to any point along one of the second cutting profile portions is either perpendicular to the central axis or inclined radially outward and axially rearward away from the central axis.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
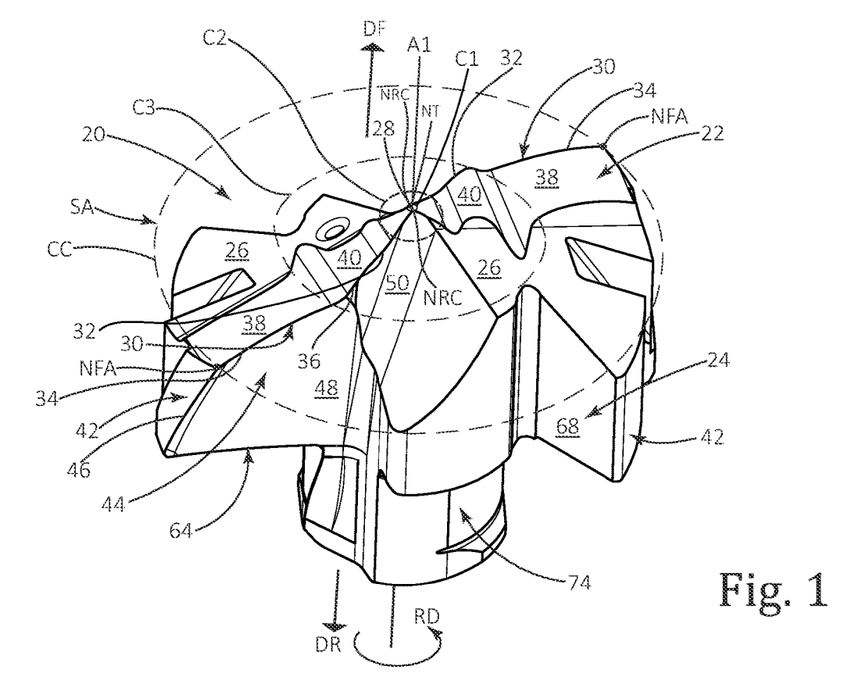
FIG. 1 is a perspective view of a cutting head in accordance with the present invention.
Figure 2:
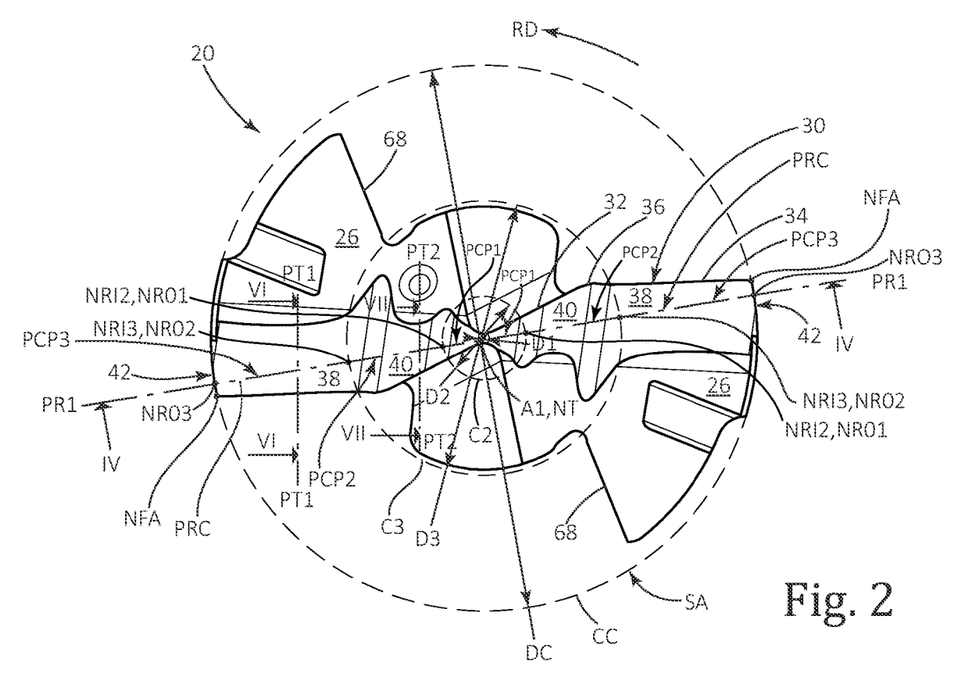
FIG. 2 is a top view of the cutting head shown in FIG. 1.
Figure 3:
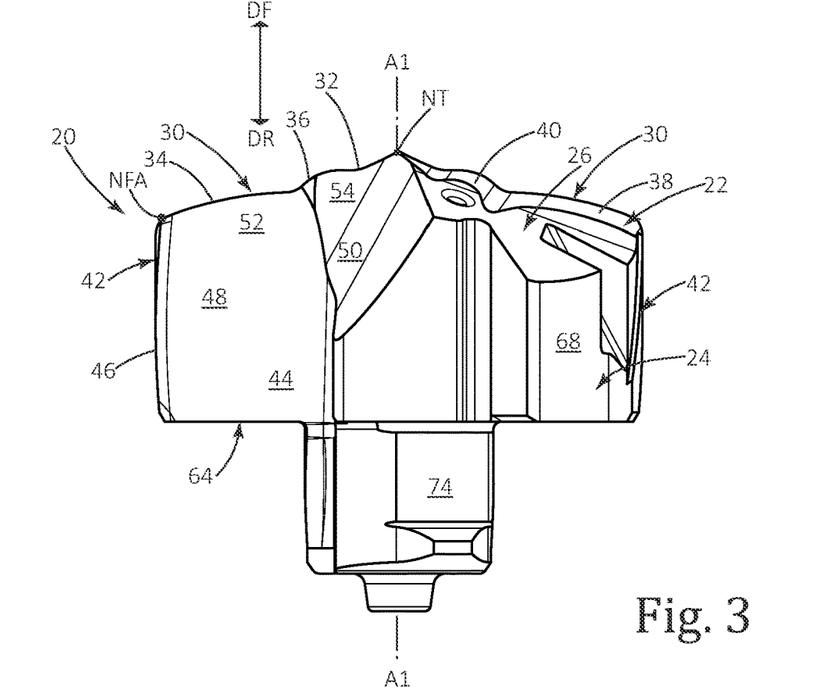
FIG. 3 is a side view of the cutting head shown in FIG. 1.

Attention is first drawn to FIGS. 1 to 3, showing a cutting head 20 rotatable about a central axis A1 in a direction of rotation RD, comprising a tip portion 22 and an intermediate portion 24.

The central axis A1 defines a forward-to-rearward axial direction DF, DR.

In some embodiments of the present invention, the cutting head 20 may be manufactured by form pressing and sintering a cemented carbide, such as tungsten carbide, and may be coated or uncoated.

As shown in FIGS. 1 to 3, the tip portion 22 has an axially forwardmost tip point NT contained in the central axis A1 and at least two axially forward-facing front surfaces 26 forming at least one chisel edge 28 extending from or containing the tip point NT.

Also, as shown in FIGS. 1 to 3, the at least one chisel edge 28 has at least two radially outermost chisel endpoints NRC.

In some embodiments of the present invention, the at least two radially outermost chisel endpoints NRC may define a first imaginary circle C1 having a first cutting diameter D1 and a center coincident with the central axis A1.

Also, in some embodiments of the present invention, as shown in FIGS. 1 to 3, the tip portion 22 may have a single chisel edge 28 perpendicular to the central axis A1 and containing the tip point NT, and the single chisel edge 28 may have two radially outermost chisel endpoints NRC.

In other embodiments of the present invention (not shown), the tip portion 22 may have at least two chisel edges extending axially rearwardly away from the tip point NT, each chisel edge having a single radially outermost chisel endpoint.

As shown in FIGS. 1 to 3, each front surface 26 has a cutting edge 30 extending radially outwardly from one of the radially outermost chisel endpoints NRC.

In some embodiments of the present invention, the tip portion 22 may have exactly two front surfaces 26 and exactly two cutting edges 30.

Also, in some embodiments of the present invention, each cutting edge 30 may have a radially inner secondary cutting-edge portion 32, and a primary cutting-edge portion 34 extending radially outwardly either directly from said secondary cutting-edge portion 32 or via a transitional cutting-edge portion 36.

For embodiments of the present invention which the secondary and primary cutting-edge portions 32, 34 of each cutting edge 30 are spaced apart by a transitional cutting-edge portion 36, as shown in FIG. 2, in the front-end view of the cutting head 20, each transitional cutting-edge portion 36 may be convex, i.e. each transitional cutting-edge portion 36 may have a convex shape.

As shown in FIGS. 1 to 3, each front surface 26 may include primary and secondary relief surfaces 38, 40 adjacent its associated primary and secondary cutting-edge portions 34, 32, respectively.

Also, as shown in FIGS. 1 to 3, the intermediate portion 24 has at least two head lands 42 circumferentially alternating with at least two chip evacuation passages 44, each head land 42 having a leading edge 46 extending axially rearwardly from the tip portion 22, and each chip evacuation passage 44 having a head flute 48 extending axially rearwardly from the tip portion 22 and intersecting one of the leading edges 46.

In some embodiments of the present invention, each primary cutting-edge portion 34 may be formed at the intersection of one of the head flutes 48 and one of the primary relief surfaces 38.

As shown in FIGS. 1 to 3, each chip evacuation passage 44 may have a gash 50 extending axially rearwardly from the tip portion 22 and intersecting one of the head flutes 48.

In some embodiments of the present invention, each secondary cutting-edge portion 32 may be formed at the intersection of one of the gashes 50 and one of the secondary relief surfaces 40.

As shown in FIGS. 1 to 3, each leading edge 46 has an axially forwardmost endpoint NFA, and the at least two axially forwardmost endpoints NFA define an imaginary cutting circle CC having a cutting diameter DC and a center coincident with the central axis A1.

In some embodiments of the present invention, the cutting head 20 may exhibit 2-fold rotational symmetry about the central axis A1.

As shown in FIGS. 1 to 3, the at least two cutting edges 30 are contained in an imaginary annular ring surface SA exhibiting circular symmetry about the central axis A1.

It should be appreciated that the imaginary annular ring surface SA defines a generally frusto-conical 3-dimensional shape.

Thus, when rotated 360° about the central axis A1, each cutting edge 30 sweeps out the same imaginary three-dimensional annual ring surface SA.

Figure 4:
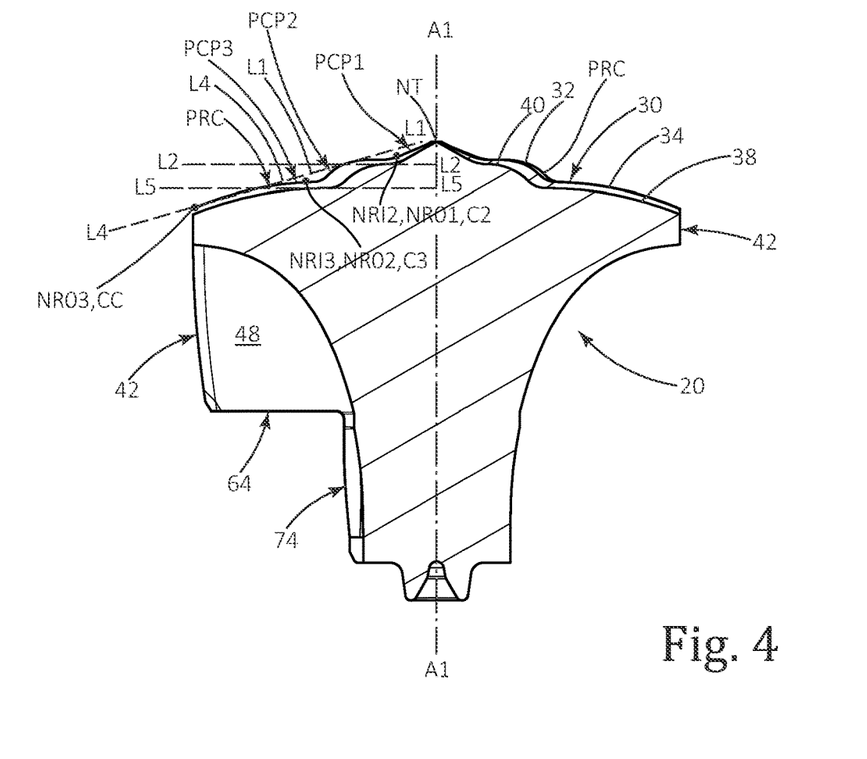
FIG. 4 is a cross-sectional view of the cutting head shown in FIG. 2, taken along the line IV-IV.

As shown in FIG. 4, in a cross-section taken in a first imaginary radial plane PR1 containing the central axis A1 and intersecting the imaginary annular ring surface SA, the imaginary annular ring surface SA forms two imaginary radial cutting profiles PRC, each imaginary radial cutting profile PRC including consecutively radially outward extending first, second, and third cutting profile portions PCP1, PCP2, PCP3.

It is understood, then, that each imaginary radial cutting profile PRC is a circumferential projection of one of the cutting edges 30 onto the first imaginary radial plane PR1. It is also noted that the cutting profile portions PCP1, PCP2, PCP3 constituting a given radial cutting profile PRC do not necessarily correspond to respective primary, secondary and transitional cutting-edge portions 34, 32, 36 of the associated cutting edge 30.

Figure 5:
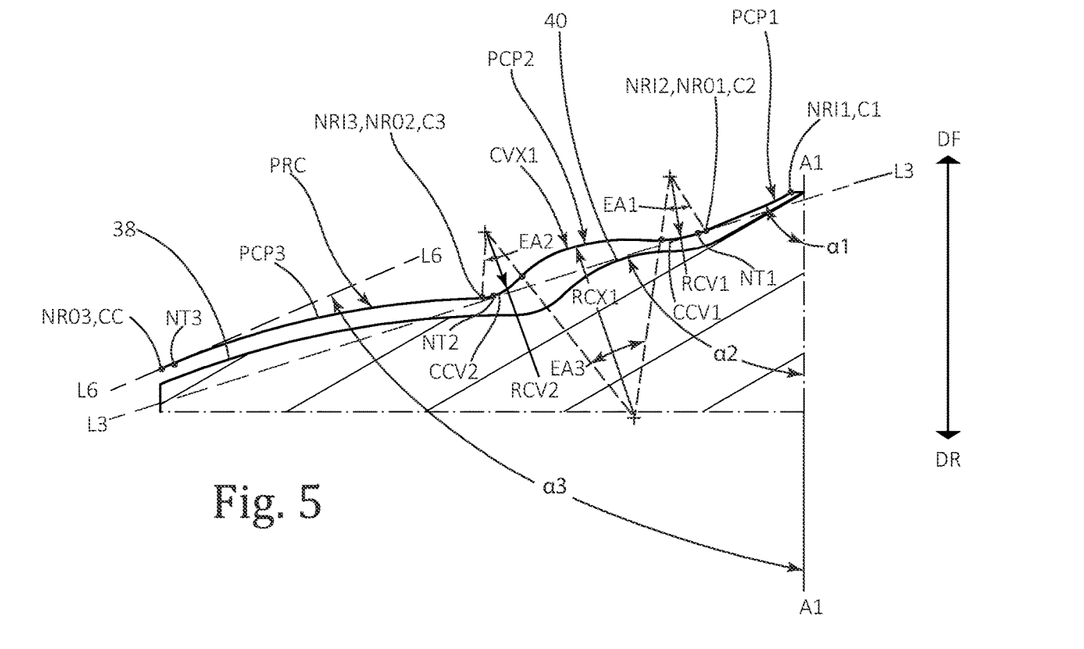
FIG. 5 is a detailed cross-sectional view of a portion of the cutting head shown in FIG. 4.

Although the first imaginary radial plane PR1 may intersect the imaginary annular ring surface SA at any rotational position, for convenience of understanding in FIGS. 4 and 5, FIG. 2 shows the first imaginary radial plane PR1 intersecting the tip portion's front surfaces 26.

As shown in FIG. 4, in the cross-section taken in the first imaginary radial plane PR1, the two imaginary radial cutting profiles PRC exhibit mirror symmetry about the central axis A1.

As shown in FIGS. 4 and 5, each first cutting profile portion PCP1 has a first radially innermost endpoint NRI1 and a first radially outermost endpoint NRO1, and each first cutting profile portion PCP1 extends radially outward and axially rearward away from the central axis A1.

In some embodiments of the present invention, each first cutting profile portion PCP1 may rectilinearly extend radially outward and axially rearward away from the central axis A1.

As shown in FIG. 5, each first cutting profile portion PCP1 may form an acute first inclination angle α1 with the central axis A1.

In some embodiments of the present invention, the first inclination angle α1 may have a minimum value of forty-five degrees and a maximum value of seventy degrees, i.e. 45°≤α1≤70°.

Also, in some embodiments of the present invention, the two first radially innermost endpoints NRI1 may lie on the first imaginary circle C1.

As shown in FIGS. 4 and 5, each second cutting profile portion PCP2 has a second radially innermost endpoint NRI2 and a second radially outermost endpoint NRO2, and includes first and second concave sub-portions CCV1, CCV2 spaced apart by a first convex sub-portion CVX1.

In some embodiments of the present invention, each of the first and second concave sub-portions CCV1, CCV2 may be curved.

Also, in some embodiments of the present invention, the first convex sub-portion CVX1 may be curved.

Further, in some embodiments of the present invention, each first convex sub-portion CVX1 may tangentially adjoin its adjacent first and second concave sub-portions CCV1, CCV2.

It should be appreciated that configuring each first cutting profile portion PCP1 to extend radially outward and axially rearward away from the central axis A1 and each second cutting profile portion PCP2 to include said first and second concave sub-portions CCV1, CCV2 spaced apart by said first convex sub-portion CVX1 advantageously promotes smooth penetration of the tip portion 22 into a workpiece.

As shown in FIGS. 1 to 5, the first concave sub-portion CCV1 of each imaginary radial cutting profile PRC may be entirely defined by the secondary cutting-edge portions 32, and the first convex sub-portion CVX1 of each imaginary radial cutting profile PRC may be at least partially defined by the secondary cutting-edge portions 32.

In some embodiments of the present invention, as shown in FIG. 2, in a front-end view of the cutting head 20, each secondary cutting-edge portion 32 may be rectilinear.

As shown in FIGS. 1 to 5, the second concave sub-portion CCV2 of each imaginary radial cutting profile PRC may be at least partially defined by the primary cutting-edge portions 34.

In some embodiments of the present invention, each primary cutting-edge portion 34 may extend rotationally rearwardly as it extends radially outwardly.

It should be appreciated that to achieve the desired configuration of the second cutting profile portions PCP2, the primary and secondary relief surfaces 38, 40 may be produced by means of a very precise manufacturing method.

In some embodiments of the present invention, the primary and secondary relief surfaces 38, 40 may be produced by a complex grinding process.

In some embodiments of the present invention, each first radially outermost endpoint NRO1 may be coincident with the adjacent second cutting profile portion's second radially innermost endpoint NRI2.

As shown in FIG. 2, the two second radially innermost endpoints NRI2 lie on a second imaginary circle C2 having a second diameter D2 and a center coincident with the central axis A1.

In some embodiments of the present invention, the second diameter D2 may be between ten and thirty percent of the cutting diameter DC, i.e. DC*0.10<D2<DC*0.30.

As shown in FIG. 2, the two second radially outermost endpoints NRO2 lie on a third imaginary circle C3 having a third diameter D3 and a center coincident with the central axis A1.

In some embodiments of the present invention, the third diameter D3 may be between forty and sixty percent of the cutting diameter DC, i.e. DC*0.40<D3<DC*0.60.

Also, in some embodiments of the present invention, the difference between the third diameter D3 and the second diameter D2 may be greater than twenty-five percent of the cutting diameter DC, i.e. D3−D2>DC*0.25.

For embodiments of the present invention in which the difference between the third diameter D3 and the second diameter D2 is greater than twenty-five percent of the cutting diameter DC, it should be appreciated that the second cutting profile portions PCP2 significantly contribute to providing smooth penetration of the tip portion 22 into a workpiece.

As shown in FIG. 5, the entire second concave sub-portion CCV2 is located radially outward of and axially rearward of the entire first concave sub-portion CCV1.

Also, as shown in FIG. 4, a first imaginary straight line L1 tangential to any point along one of the second cutting profile portions PCP2 is either perpendicular to the central axis A1 or inclined radially outward and axially rearward away from the central axis A1, or in other words, the first imaginary straight line L1 is not inclined radially outward and axially forward away from the central axis A1.

It should be appreciated that configuring each second cutting profile portion PCP2 such that the first imaginary straight line L1 is not inclined radially outward and axially forward away from the central axis A1, advantageously results in each second cutting profile portion PCP2 being devoid of axial 'dips' and high cutting-edge stresses associated therewith during drilling operations.

It should also be appreciated that configuring each second cutting profile portion PCP2 to be devoid of axial 'dips' along its length advantageously improves the manufacturability of the primary and secondary relief surfaces 38, 40.

In some embodiments of the present invention, as shown in FIG. 4, a second imaginary straight line L2 perpendicular to the central axis A1 and intersecting any point along one of the second cutting profile portions PCP2 will only traverse the said second cutting profile portion PCP2 once.

As shown in FIG. 5, a third imaginary straight line L3 simultaneously tangential to first and second tangent points NT1, NT2 along the first and second concave sub-portions CCV1, CCV2, respectively, of one of the imaginary radial cutting profiles PRC, may form an acute second inclination angle α2 with the central axis A1.

In some embodiments of the present invention, the second inclination angle α2 may have a minimum value of fifty-five degrees and a maximum value of eighty degrees, i.e. 55°≤α2≤80°.

Also, in some embodiments of the present invention, the first inclination angle α1 may be less than the second inclination angle α2, i.e. α1<α2.

It should be appreciated that configuring the first inclination angle α1 to be less than the second inclination angle α2 advantageously promotes accurate centering combined with smooth penetration of the tip portion 22 into a workpiece.

Further, in some embodiments of the present invention, apart from the first and second tangent points NT1, NT2, the entire associated imaginary radial cutting profile PRC may be located on one side of the third imaginary straight line L3.

As shown in FIG. 5, the first and second concave sub-portions CCV1, CCV2 have first and second concave radii RCV1, RCV2, respectively.

In some embodiments of the present invention, each of the first and second concave radii RCV1, RCV2 may be less than fifteen percent of the cutting diameter DC, i.e. RCV1<DC*0.15, RCV2<DC*0.15.

Also, in some embodiments of the present invention, each of the first and second concave radii RCV1, RCV2 may be constant.

Further, in some embodiments of the present invention, each of the first and second concave radii RCV1, RCV2 may be less than 3.0 mm.

As shown in FIG. 5, the first and second concave sub-portions CCV1, CCV2 have first and second angular extents EA1, EA2, respectively.

In some embodiments of the present invention, the second angular extent EA2 may be greater than the first angular extent EA1.

Also, in some embodiments of the present invention, the second angular extent EA2 may be greater than thirty degrees, i.e. EA2>30°.

As shown in FIG. 5, the first convex sub-portion CVX1 has a first convex radius RCX1.

In some embodiments of the present invention, the first convex radius RCX1 may be greater than each of the first and second concave radii RCV1, RCV2, i.e. RCX1>RCV1, RCX1>RCV2.

Also, in some embodiments of the present invention, the first convex radius RCX1 may be less than thirty percent of the cutting diameter DC, i.e. RCX1<DC*0.30.

Further, in some embodiments of the present invention, the first convex radius RCX1 may be constant.

Yet further, in some embodiments of the present invention, the first convex radius RCX1 may be less than 6.0 mm.

As shown in FIG. 5, the first convex sub-portion CVX1 has a third angular extent EA3.

In some embodiments of the present invention, the third angular extent EA3 may be greater than thirty degrees, i.e. EA3>30°.

Also, in some embodiments of the present invention, the third angular extent EA3 may be greater than the first angular extent EA1.

Further, in some embodiments of the present invention, the third angular extent EA3 may be equal to the second angular extent EA2.

For embodiments of the present invention in which the first convex radius RCX1 is greater than each of the first and second concave radii RCV1, RCV2 and the third angular extent EA3 is greater than thirty degrees, it should be appreciated that the first convex sub-portion CVX1 significantly contributes to providing smooth penetration of the tip portion 22 into a workpiece.

As shown in FIG. 4, a fourth imaginary straight line L4 tangential to any point along one of the imaginary radial cutting profiles PRC may be either perpendicular to the central axis A1 or inclined radially outward and axially rearward away from the central axis A1, or in other words, the fourth imaginary straight line L4 is not inclined radially outward and axially forward away from the central axis A1.

It should be appreciated that configuring each imaginary radial cutting profile PRC such that the fourth imaginary straight line L4 is not inclined radially outward and axially forward away from the central axis A1, advantageously results in each imaginary radial cutting profile PRC being devoid of axial 'dips' and high cutting-edge stresses associated therewith during drilling operations.

It should also be appreciated that configuring each imaginary radial cutting profile PRC to be devoid of axial 'dips' along its length advantageously improves the manufacturability of the primary and secondary relief surfaces 38, 40.

It should be further appreciated that the fourth imaginary straight line L4 may be correspond to the first imaginary straight line L1 when tangential to the same points of the associated second cutting profile portion PCP2.

In some embodiments of the present invention, a fifth imaginary straight line L5 perpendicular to the central axis A1 and intersecting any point along one of the imaginary radial cutting profiles PRC may only traverse the said imaginary radial cutting profile PRC once.

It should be appreciated that the fifth imaginary straight line L5 may be correspond to the second imaginary straight line L2 when intersecting the same points of the associated second cutting profile portion PCP2.

As shown in FIGS. 4 and 5, each third cutting profile portion PCP3 has a third radially innermost endpoint NRI3 and a third radially outermost endpoint NRO3.

In some embodiments of the present invention, each third radially innermost endpoint NRI3 may be coincident with the adjacent second cutting profile portion's second radially outermost endpoint NRO2.

Also, in some embodiments of the present invention, the two third radially outermost endpoints NRO3 may lie on the imaginary cutting circle CC.

The first radially innermost endpoint NRI1 of each first cutting profile portion PCP1 may coincide with the radially innermost point NRI1 of its associated radial cutting profile PRC. Meanwhile, the third radially outermost endpoint NRO3 of each third cutting profile portion PCP3 may coincide with the radially outermost point NRO3 of its associated radial cutting profile PRC. As shown in FIGS. 1 to 5, in the cross-section taken in the first imaginary radial plane PR1 containing the central axis A1, each imaginary radial cutting profile PRC extends monotonically in the axially rearward direction DR, between its radially innermost endpoint NRI1 and its radially outermost endpoint NRO3. In other words, in the radially outward direction, each imaginary radial cutting profile PRC always extends either perpendicular to the central axis A1 or in the axially rearward direction DR.

In addition to extending monotonically in the axially rearward direction DR, each imaginary radial cutting profile PRC may be smoothly curved between its radially innermost endpoint NRI1 and its radially outermost endpoint NRO3. In other words, each imaginary radial cutting profile PRC may be devoid of discontinuities, such as those caused by steps of the sort seen in the aforementioned US 2011/0116884 A1 and WO 2013/143348 A1. Accordingly, angles of tangent lines along the length of a given imaginary radial cutting profile PRC vary gradually, instead of experiencing jump discontinuities by virtue of such steps.

As shown in FIGS. 4 and 5, the circumferential projection of each cutting edge 30 onto the first imaginary radial plane PR1 forms an imaginary radial cutting profile PRC which may have a radially innermost endpoint NR11 on the first imaginary circle C1 and a radially outermost endpoint NRO3 on the cutting circle CC. Furthermore, between the radially innermost endpoint NR11 and the radially outermost endpoint NRO3, each imaginary radial cutting profile PRC contains two concave sub-portions CCV1, CCV2 which are spaced apart by a first convex sub-portion CVX1.

As shown in FIGS. 4 and 5, each third cutting profile portion PCP3 may continuously extend radially outward and axially rearward away from the central axis A1.

In some embodiments of the present invention, each third cutting profile portion PCP3 may be convex.

As shown in FIG. 5, a sixth imaginary straight line L6 tangential to a third tangent point NT3 along one of the third cutting profile portions PCP3 adjacent to its third radially outermost endpoint NRO3 may form an acute third inclination angle $\alpha 3$ with the central axis A1.

In some embodiments of the present invention, the third inclination angle $\alpha 3$ may have a minimum value of sixty degrees and a maximum value of eighty degrees, i.e. $60°\leq\alpha 3\leq 80°$.

It should be appreciated that configuring each third cutting profile portion PCP3 such that the third inclination angle $\alpha 3$ is greater than sixty degrees enables the drilling of a blind hole in a workpiece having a wide entry angle of greater than one hundred and twenty degrees, which may be advantageous for the subsequent drilling of a smaller diameter hole along the same hole axis.

Also, in some embodiments of the present invention, the third inclination angle $\alpha 3$ may be greater than the first inclination angle $\alpha 1$, i.e. $\alpha 3>\alpha 1$.

As shown in FIGS. 1 to 3, a primary rake surface 52 may be disposed on each head flute 48 adjacent the associated primary cutting-edge portion 34.

Figure 6:
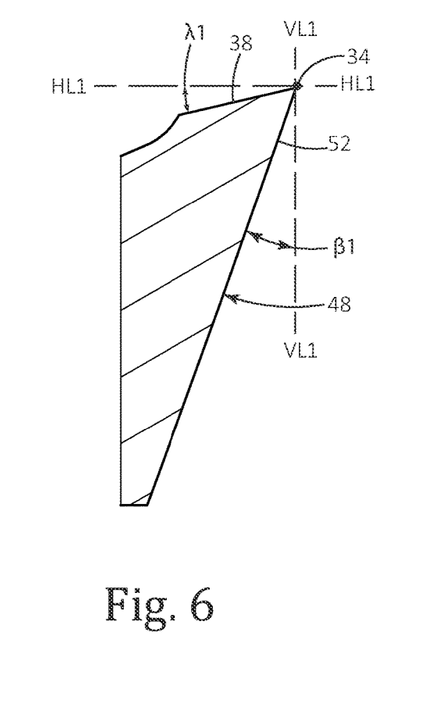
FIG. 6 is a cross-sectional view of the cutting head shown in FIG. 2, taken along the line VI-VI.

As shown in FIG. 6, in a cross-section taken in a first transverse plane PT1 parallel to the central axis A1 and intersecting one of the primary cutting-edge portions 34 at any point along its length, the primary rake surface 52 may be inclined at a first axial rake angle 131 relative to a first imaginary vertical reference line VL1 parallel to the central axis A1.

In some embodiments of the present invention, the first axial rake angle $\beta 1$ may be positive.

It should be appreciated throughout the specification and claims that the first axial rake angle $\beta 1$ is positive in a configuration that the primary rake surface 52 extends rotationally rearwardly as it extends away from the associated primary cutting-edge portion 34.

It should also be appreciated that the primary cutting-edge portions 34 are susceptible to greater wear than the secondary cutting-edge portions 32 due to their relatively higher cutting speeds, and that configuring the primary rake surface 52 to be positive reduces wear on the primary cutting-edge portions 34, thus prolonging the operative life thereof.

As shown in FIG. 6, in the cross-section taken in the first transverse plane PT1, the primary relief surface 38 may be inclined at a first relief angle $\lambda 1$ relative to a first imaginary horizontal reference line HL1 perpendicular to the central axis A1.

In some embodiments of the present invention, the first relief angle $\lambda 1$ may have a nominal value of between 5 and 12 degrees, i.e. $5°<\lambda 1<12°$.

It should be appreciated throughout the specification and claims that at any cross-section taken in a transverse plane intersecting one of the primary cutting-edge portions 34, the adjacent primary relief surface 38 extends axially rearwardly as it extends away from the primary cutting-edge portion 34.

In some embodiments of the present invention, the first relief angle 21 may be constant along the length of the primary cutting-edge portion 34.

As shown in FIGS. 1 to 3, a secondary rake surface 54 is disposed on each gash 50 adjacent the associated secondary cutting-edge portion 32.

Figure 7:
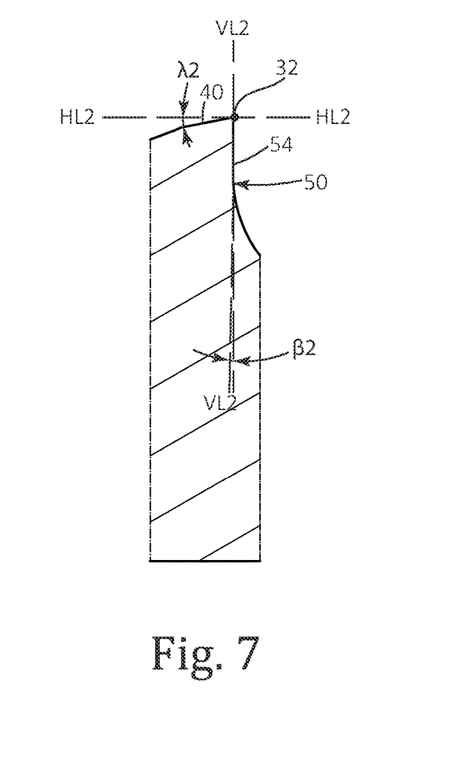
FIG. 7 is a cross-sectional view of the cutting head shown in FIG. 2, taken along the line VII-VII.

As shown in FIG. 7, in a cross-section taken in a second transverse plane PT2 parallel to the central axis A1 and intersecting one of the secondary cutting-edge portions 32 at any point along its length, the secondary rake surface 54 may be inclined at a second axial rake angle $\beta 2$ relative to a second imaginary vertical reference line VL2 parallel to the central axis A1.

In some embodiments of the present invention, the second axial rake angle $\beta 2$ may be negative.

It should be appreciated throughout the specification and claims that the second axial rake angle $\beta 2$ is negative in a configuration that the secondary rake surface 54 extends rotationally forwardly as it extends away from the secondary cutting-edge portion 32.

It should also be appreciated that the secondary cutting-edge portions 32 are susceptible to greater impact forces than the primary cutting-edge portions 34 due to their relatively lower cutting speeds, especially at high feed rates, and that configuring the second axial rake angle $\beta 2$ to be negative increases the stability and robustness of the secondary cutting-edge portions 32, thus prolonging the operative life thereof.

As shown in FIG. 7, in the cross-section taken in the second transverse plane PT2, the secondary relief surface 40 may be inclined at a second relief angle $\lambda 2$ relative to a second imaginary horizontal reference line HL2 perpendicular to the central axis A1.

In some embodiments of the present invention, the second relief angle $\lambda 2$ may have a nominal value of between 5 and 12 degrees, i.e. $5°<\lambda 2<12°$.

It should be appreciated throughout the specification and claims that at any cross-section taken in a transverse plane intersecting one of the secondary cutting-edge portions 32, the adjacent secondary relief surface 40 extends axially rearwardly as it extends away from the secondary cutting-edge portion 32.

In some embodiments of the present invention, the second relief angle $\lambda 2$ may be constant along the length of the secondary cutting-edge portion 32.

Also, in some embodiments of the present invention, the second relief angle $\lambda 2$ may be equal to the first relief angle $\lambda 1$, i.e. $\lambda 2=\lambda 1$.

It should be appreciated that the first and second relief angles $\lambda 1$, $\lambda 2$ may have an accuracy of one degree greater than or less than a nominal value.

Figure 8:
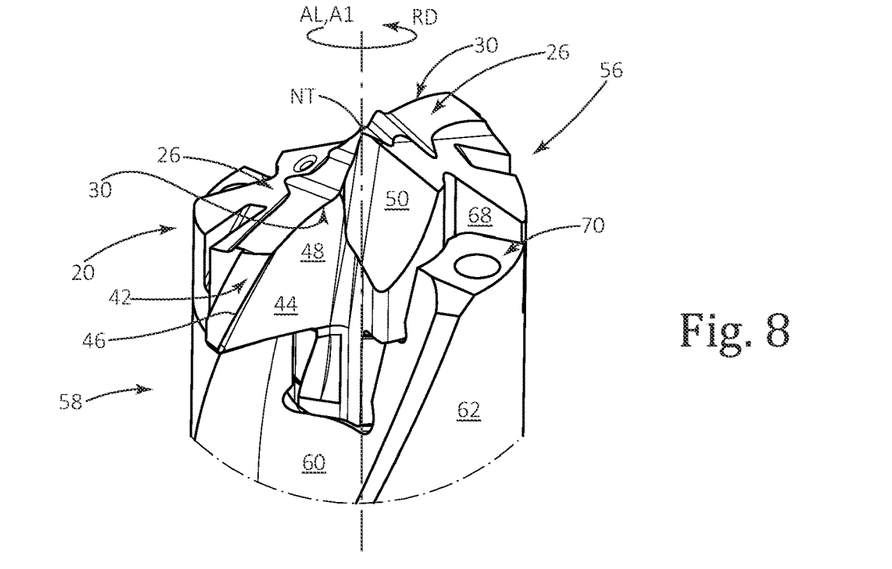
FIG. 8 is a perspective view of a rotary cutting tool in accordance with the present invention.
Figure 9:
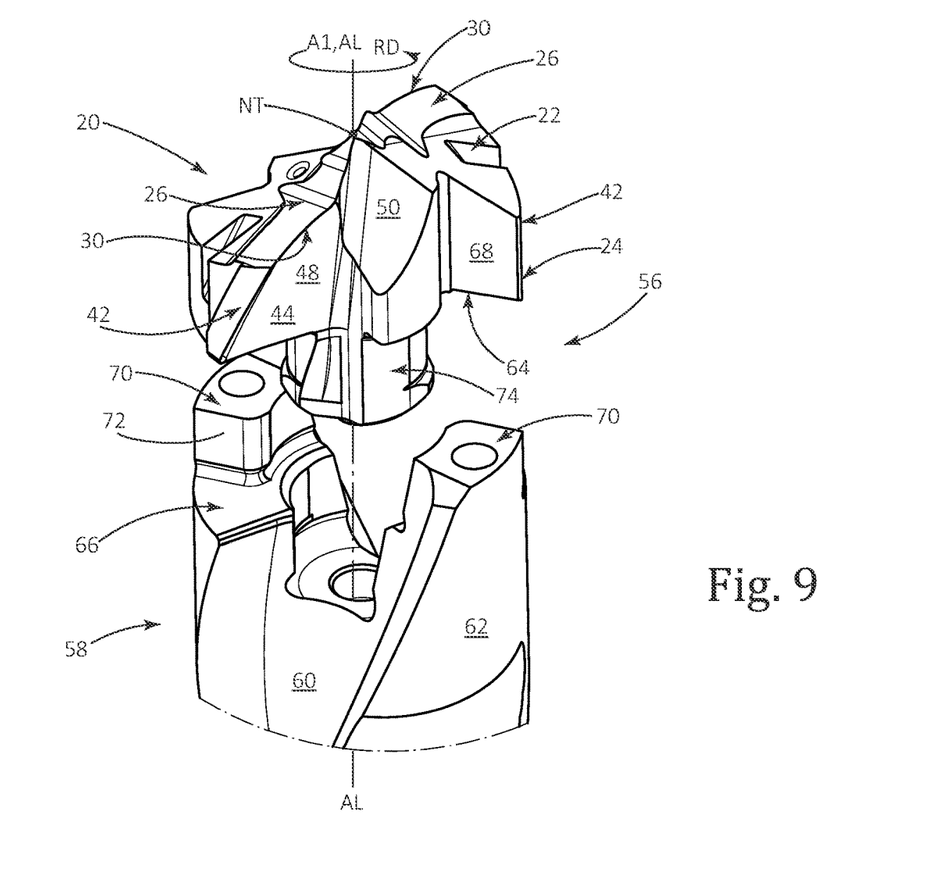
FIG. 9 is an exploded view of the rotary cutting tool shown in FIG. 8.

Attention is now drawn to FIGS. 8 and 9, showing a rotary cutting tool 56 according to the present invention, comprising the cutting head 20 and a shank 58 having a longitudinal axis AL.

The shank 58 has two shank flutes 60 circumferentially alternating with two shank lands 62, and each shank flute 60 may extend helically along the longitudinal axis AL.

As shown in FIGS. 8 and 9, the cutting head 20 may have an axially rearward facing bottom surface 64, the shank 58 may have a support surface 66 transverse to the longitudinal axis AL, and the cutting head 20 may be removably mounted to the shank 58 with the bottom surface 64 in contact with the support surface 66.

Configuring the cutting head 20 to be removably mounted to the shank 58 enables the cutting head 20 to be manufactured from a suitably hard material, such as tungsten carbide, and the shank 58 to be manufactured from a less hard and less expensive material, such as high-speed steel. The shank 58 may be reusable following disposal of a worn or damaged cutting head 20.

In some embodiments of the present invention, each head flute 48 may intersect the bottom surface 64 and cooperate with one of the shank flutes 60.

Also, in some embodiments of the present invention, the bottom surface 64 may be perpendicular to the central axis A1, the support surface 66 may be perpendicular to the longitudinal axis AL, and the central axis A1 may be coaxial with the longitudinal axis AL.

As shown in FIGS. 8 and 9, the intermediate portion 24 of the cutting head 20 may include at least two torque transmission surfaces 68 facing opposite the direction of rotation RD, the shank 58 may include at least two drive protuberances 70, with each drive protuberance 70 having a drive surface 72 facing the direction of rotation RD, and each torque transmission surface 68 may be in contact with one of the drive surfaces 72.

In some embodiments of the present invention, each torque transmission surfaces 68 may intersect one of the front surfaces 26.

As shown in FIGS. 8 and 9, the cutting head 20 may include a mounting protuberance 74 extending axially rearwardly from the bottom surface 64.

In other embodiments of the present invention (not shown), the cutting head 20 and the shank 58 may be integral parts of a unitary one-piece construction, for example, a solid drill, and each head flute 48 may merge with one of the shank flutes 60.

Although the present invention has been described to a certain degree of particularity, it should be understood that various alterations and modifications could be made without departing from the spirit or scope of the invention as hereinafter claimed.

What is claimed is:

1. A cutting head (20) rotatable about a central axis (A1) in a direction of rotation (RD), the central axis (A1) defining a forward-to-rearward axial direction (DF, DR), and comprising:
    a tip portion (22) having an axially forwardmost tip point (NT) contained in the central axis (A1) and at least two axially forward-facing front surfaces (26) forming at least one chisel edge (28) extending from or containing the tip point (NT),
        the at least one chisel edge (28) having at least two radially outermost chisel endpoints (NRC); and
        each front surface (26) having a cutting edge (30) extending radially outwardly from one of the radially outermost chisel endpoints (NRC), and
    an intermediate portion (24) having at least two head lands (42) circumferentially alternating with at least two chip evacuation passages (44), each head land (42) having a leading edge (46) extending axially rearwardly from the tip portion (22), and each chip evacuation passage (44) having a head flute (48) extending axially rearwardly from the tip portion (22) and intersecting one of the leading edges (46),
        each leading edge (46) having an axially forwardmost endpoint (NFA), and the at least two axially forwardmost endpoints (NFA) defining an imaginary cutting circle (CC) having a cutting diameter (DC) and a center coincident with the central axis (A1), wherein:
    the at least two cutting edges (30) are contained in an imaginary three-dimensional annular ring surface (SA) exhibiting circular symmetry about the central axis (A1),
    in a cross-section taken in a first imaginary radial plane (PR1) containing the central axis (A1) and intersecting the imaginary annular ring surface (SA), the imaginary annular ring surface (SA) forms two imaginary radial cutting profiles (PRC), each imaginary radial cutting profile (PRC) including consecutively radially outward extending first, second, and third cutting profile portions (PCP1, PCP2, PCP3),
    each first cutting profile portion (PCP1) has a first radially innermost endpoint (NRI1) and a first radially outermost endpoint (NRO1), and extends radially outward and axially rearward away from the central axis (A1),
    each second cutting profile portion (PCP2) has a second radially innermost endpoint (NR12) and a second radially outermost endpoint (NRO2), and includes curved first and second concave sub-portions (CCV1, CCV2) spaced apart by a curved first convex sub-portion (CVX1),
    the entire second concave sub-portion (CCV2) is located radially outward of, and axially rearward of, the entire first concave sub-portion (CCV1),
    a first imaginary straight line (L1) tangential to any point along one of the second cutting profile portions (PCP2) is either perpendicular to the central axis (A1) or inclined radially outward and axially rearward away from the central axis (A1),
    each cutting edge (30) has a radially inner secondary cutting-edge portion (32), and a primary cutting-edge portion (34) extending radially outwardly either directly from said secondary cutting-edge portion (32) or via a transitional cutting-edge portion (36),
    each front surface (26) includes a primary and secondary relief surfaces (38, 40) adjacent its associated primary and secondary cutting-edge portions (34, 32), respectively,
    each primary cutting-edge portion (34) is formed at the intersection of one of the head flutes (48) and one of the primary relief surfaces (38),
    a primary rake surface (52) is disposed on each head flute (48) adjacent the associated primary cutting-edge portion (34),
    in a cross-section taken in a first transverse plane (PT1) parallel to the central axis (A1) and intersecting one of the primary cutting-edge portions (34) at any point along its length, the primary rake surface (52) is inclined at a first axial rake angle ($\beta1$) relative to a first imaginary vertical reference line (VL1) parallel to the central axis (A1), and
    the first axial rake angle (1) is positive.

2. The cutting head (20) according to claim 1, wherein:
    a third imaginary straight line (L3) simultaneously tangential to first and second tangent points (NT1, NT2) along the first and second concave sub-portions (CCV1, CCV2), respectively, of one of the imaginary radial cutting profiles (PRC), forms an acute second inclination angle (2) with the central axis (A1), and
    the second inclination angle ($\alpha2$) has a minimum value of fifty-five degrees and a maximum value of eighty degrees.

3. The cutting head (20) according to claim 2, wherein:
apart from the first and second tangent points (NT1, NT2), the entire associated imaginary radial cutting profile (PRC) is located on one side of the third imaginary straight line (L3).

4. The cutting head (20) according to claim 1, wherein:
the first and second concave sub-portions (CCV1, CCV2) have first and second concave radii (RCV1, RCV2), respectively, and
each of the first and second concave radii (RCV1, RCV2) is less than fifteen percent of the cutting diameter (DC).

5. The cutting head (20) according to claim 4, wherein:
the first convex sub-portion (CVX1) has a first convex radius (RCX1), and
the first convex radius (RCX1) is greater than each of the first and second concave radii (RCV1, RCV2).

6. The cutting head (20) according to claim 5, wherein:
the first convex radius (RCX1) has a third angular extent (EA3), and
the third angular extent (EA3) is greater than thirty degrees.

7. The cutting head (20) according to claim 1, wherein:
the two second radially innermost endpoints (NRI2) lie on a second imaginary circle (C2) having a second diameter (D2) and a center coincident with the central axis (A1), and
the second diameter (D2) is between ten and thirty percent of the cutting diameter (DC).

8. The cutting head (20) according to claim 7, wherein:
the two second radially outermost endpoints (NRO2) lie on a third imaginary circle (C3) having a third diameter (D3) and a center coincident with the central axis (A1), and
the difference between the third diameter (D3) and the second diameter (D2) is greater than twenty-five percent of the cutting diameter (DC).

9. The cutting head (20) according to claim 1, wherein:
each first cutting profile portion (PCP1) rectilinearly extends radially outward and axially rearward away from the central axis (A1), forming an acute first inclination angle ($\alpha 1$) with the central axis (A1), and
the first inclination angle ($\alpha 1$) a minimum value of forty-five degrees and a maximum value of seventy degrees.

10. The cutting head (20) according to claim 1, wherein:
the first radially outermost endpoint (NRO1) is coincident with the second cutting profile portion's second radially innermost endpoint (NRI2).

11. The cutting head (20) according to claim 1, wherein:
the at least two radially outermost chisel endpoints (NRC) define a first imaginary circle (C1) having a first cutting diameter (D1) and a center coincident with the central axis (A1), and
the two first radially innermost endpoints (NRI1) lie on the first imaginary circle (C1).

12. The cutting head (20) according to claim 1, wherein:
each third cutting profile portion (PCP3) is convex.

13. The cutting head (20) according to claim 1, wherein:
each third cutting profile portion (PCP3) has a third radially innermost endpoint (NRI3) and a third radially outermost endpoint (NRO3), and continuously extends radially outward and axially rearward away from the central axis (A1).

14. The cutting head (20) according to claim 13, wherein:
the third radially innermost endpoint (NRI3) is coincident with the second cutting profile portion's second radially outermost endpoint (NRO2).

15. The cutting head (20) according to claim 13, wherein:
a sixth imaginary straight line (L6) tangential to a third tangent point (NT3) along one of the third cutting profile portions (PCP3) adjacent to its third radially outermost endpoint (NRO3), forms an acute third inclination angle ($\alpha 3$) with the central axis (A1), and
the third inclination angle ($\alpha 3$) has a minimum value of sixty degrees and a maximum value of eighty degrees.

16. The cutting head (20) according to claim 13, wherein:
the third radially outermost endpoint (NRO3) lies on the imaginary cutting circle (CC).

17. The cutting head (20) according to claim 1, wherein:
the second concave sub-portion (CCV2) of each imaginary radial cutting profile (PRC) is at least partially defined by the primary cutting-edge portions (34), and
each primary cutting-edge portion (34) extends rotationally rearwardly as it extends radially outwardly.

18. The cutting head (20) according to claim 1, wherein:
in a front-end view of the cutting head (20), each transitional cutting-edge portion (36) is convex.

19. A cutting head (20) rotatable about a central axis (A1) in a direction of rotation (RD), the central axis (A1) defining a forward-to-rearward axial direction (DF, DR), and comprising:
a tip portion (22) having an axially forwardmost tip point (NT) contained in the central axis (A1) and at least two axially forward-facing front surfaces (26) forming at least one chisel edge (28) extending from or containing the tip point (NT),
the at least one chisel edge (28) having at least two radially outermost chisel endpoints (NRC); and
each front surface (26) having a cutting edge (30) extending radially outwardly from one of the radially outermost chisel endpoints (NRC), and
an intermediate portion (24) having at least two head lands (42) circumferentially alternating with at least two chip evacuation passages (44), each head land (42) having a leading edge (46) extending axially rearwardly from the tip portion (22), and each chip evacuation passage (44) having a head flute (48) extending axially rearwardly from the tip portion (22) and intersecting one of the leading edges (46),
each leading edge (46) having an axially forwardmost endpoint (NFA), and the at least two axially forwardmost endpoints (NFA) defining an imaginary cutting circle (CC) having a cutting diameter (DC) and a center coincident with the central axis (A1),
wherein:
the at least two cutting edges (30) are contained in an imaginary three-dimensional annular ring surface (SA) exhibiting circular symmetry about the central axis (A1),
in a cross-section taken in a first imaginary radial plane (PR1) containing the central axis (A1) and intersecting the imaginary annular ring surface (SA), the imaginary annular ring surface (SA) forms two imaginary radial cutting profiles (PRC), each imaginary radial cutting profile (PRC) including consecutively radially outward extending first, second, and third cutting profile portions (PCP1, PCP2, PCP3),
each first cutting profile portion (PCP1) has a first radially innermost endpoint (NRI1) and a first radially outermost endpoint (NRO1), and extends radially outward and axially rearward away from the central axis (A1),
each second cutting profile portion (PCP2) has a second radially innermost endpoint (NRI2) and a second radially outermost endpoint (NRO2), and includes curved first and second concave sub-portions (CCV1, CCV2) spaced apart by a curved first convex sub-portion (CVX1), the entire second concave sub-portion (CCV2) is located radially outward of, and axially rearward of, the entire first concave sub-portion (CCV1), a first imaginary straight line (L1) tangential to any point along one of the second cutting profile portions (PCP2) is either perpendicular to the central axis (A1) or inclined radially outward and axially rearward away from the central axis (A1), each cutting edge (30) has a radially inner secondary cutting-edge portion (32), and a primary cutting-edge portion (34) extending radially outwardly either directly from said secondary cutting-edge portion (32) or via a transitional cutting-edge portion (36), each front surface (26) includes a primary and secondary relief surfaces (38, 40) adjacent its associated primary and secondary cutting-edge portions (34, 32), respectively, the first concave sub-portion (CCV1) of each imaginary radial cutting profile (PRC) is entirely defined by the secondary cutting-edge portions (32), the first convex sub-portion (CVX1) of each imaginary radial cutting profile (PRC) is at least partially defined by the secondary cutting-edge portions (32), and in a front-end view of the cutting head (20), each secondary cutting-edge portion (32) is rectilinear.

20. A cutting head (20) rotatable about a central axis (A1) in a direction of rotation (RD), the central axis (A1) defining a forward-to-rearward axial direction (DF, DR), and comprising:

a tip portion (22) having an axially forwardmost tip point (NT) contained in the central axis (A1) and at least two axially forward-facing front surfaces (26) forming at least one chisel edge (28) extending from or containing the tip point (NT), the at least one chisel edge (28) having at least two radially outermost chisel endpoints (NRC); and each front surface (26) having a cutting edge (30) extending radially outwardly from one of the radially outermost chisel endpoints (NRC), and an intermediate portion (24) having at least two head lands (42) circumferentially alternating with at least two chip evacuation passages (44), each head land (42) having a leading edge (46) extending axially rearwardly from the tip portion (22), and each chip evacuation passage (44) having a head flute (48) extending axially rearwardly from the tip portion (22) and intersecting one of the leading edges (46), each leading edge (46) having an axially forwardmost endpoint (NFA), and the at least two axially forwardmost endpoints (NFA) defining an imaginary cutting circle (CC) having a cutting diameter (DC) and a center coincident with the central axis (A1), wherein:

the at least two cutting edges (30) are contained in an imaginary three-dimensional annular ring surface (SA) exhibiting circular symmetry about the central axis (A1), in a cross-section taken in a first imaginary radial plane (PR1) containing the central axis (A1) and intersecting the imaginary annular ring surface (SA), the imaginary annular ring surface (SA) forms two imaginary radial cutting profiles (PRC), each imaginary radial cutting profile (PRC) including consecutively radially outward extending first, second, and third cutting profile portions (PCP1, PCP2, PCP3), each first cutting profile portion (PCP1) has a first radially innermost endpoint (NRI1) and a first radially outermost endpoint (NRO1), and extends radially outward and axially rearward away from the central axis (A1), each second cutting profile portion (PCP2) has a second radially innermost endpoint (NRI2) and a second radially outermost endpoint (NRO2), and includes curved first and second concave sub-portions (CCV1, CCV2) spaced apart by a curved first convex sub-portion (CVX1), the entire second concave sub-portion (CCV2) is located radially outward of, and axially rearward of, the entire first concave sub-portion (CCV1), a first imaginary straight line (L1) tangential to any point along one of the second cutting profile portions (PCP2) is either perpendicular to the central axis (A1) or inclined radially outward and axially rearward away from the central axis (A1), each cutting edge (30) has a radially inner secondary cutting-edge portion (32), and a primary cutting-edge portion (34) extending radially outwardly either directly from said secondary cutting-edge portion (32) or via a transitional cutting-edge portion (36), each front surface (26) includes a primary and secondary relief surfaces (38, 40) adjacent its associated primary and secondary cutting-edge portions (34, 32), respectively, each chip evacuation passage (44) has a gash (50) extending axially rearwardly from the tip portion (22) and intersecting one of the head flutes (48), each secondary cutting-edge portion (32) is formed at the intersection of one of the gashes (50) and one of the secondary relief surfaces (40), a secondary rake surface (54) is disposed on each gash (50) adjacent the associated secondary cutting-edge portion (32), in a cross-section taken in a second transverse plane (PT2) parallel to the central axis (A1) and intersecting one of the secondary cutting-edge portions (32) at any point along its length, the secondary rake surface (54) is inclined at a second axial rake angle (B2) relative to a second imaginary vertical reference line (VL2) parallel to the central axis (A1), and the second axial rake angle (B2) is negative.

* * * * *

UNITED STATES PATENT AND TRADEMARK OFFICE
CERTIFICATE OF CORRECTION

| | |
|---|---|
| PATENT NO. | : 12,109,635 B2 |
| APPLICATION NO. | : 17/677073 |
| DATED | : October 8, 2024 |
| INVENTOR(S) | : Shim'on Shitrit and Anatoly Yanovski |

It is certified that error appears in the above-identified patent and that said Letters Patent is hereby corrected as shown below:

In the Specification

Column 9, Line 41, the text "be inclined at a first axial rake angle 131 relative to a first" should be changed to --be inclined at a first axial rake angle $\beta 1$ relative to a first--

Column 10, Line 4, the text "relief angle 21 may be constant along the length of the" should be changed to --relief angle $\lambda 1$ may be constant along the length of the--

In the Claims

Claim 1, Column 12, Line 57, the text "the first axial rake angle (1) is positive" should be changed to --the first axial rake angle ($\beta 1$) is positive--

Signed and Sealed this
Fourth Day of February, 2025

Coke Morgan Stewart
*Acting Director of the United States Patent and Trademark Office*